US010900526B2

(12) United States Patent
Davies

(10) Patent No.: US 10,900,526 B2
(45) Date of Patent: Jan. 26, 2021

(54) BRAKING DEVICE

(71) Applicant: Goodrich Actuation Systems Limited, Solihull (GB)

(72) Inventor: Stephen Davies, Shrewsbury (GB)

(73) Assignee: GOODRICH ACTUATION SYSTEMS LIMITED, Solihull (GB)

( * ) Notice: Subject to any disclaimer, the term of this patent is extended or adjusted under 35 U.S.C. 154(b) by 116 days.

(21) Appl. No.: 16/179,094

(22) Filed: Nov. 2, 2018

(65) Prior Publication Data
US 2019/0128343 A1 May 2, 2019

(30) Foreign Application Priority Data

Nov. 2, 2017 (EP) ..................... 17275178

(51) Int. Cl.
| F16D 41/067 | (2006.01) |
| F16D 3/10 | (2006.01) |
| F16D 47/04 | (2006.01) |
| F16D 3/72 | (2006.01) |
| F16D 47/02 | (2006.01) |
| B64C 9/24 | (2006.01) |
| B60T 1/06 | (2006.01) |
| B64C 13/24 | (2006.01) |

(52) U.S. Cl.
CPC ............ *F16D 41/067* (2013.01); *B60T 1/062* (2013.01); *B64C 9/24* (2013.01); *F16D 3/10* (2013.01); *F16D 3/72* (2013.01); *F16D 47/02* (2013.01); *F16D 47/04* (2013.01); *B64C 13/24* (2013.01)

(58) Field of Classification Search
CPC ........ F16D 41/067; F16D 47/04; F16D 47/02; F16D 3/10; F16D 3/72; B64C 9/24
See application file for complete search history.

(56) References Cited

U.S. PATENT DOCUMENTS

| 5,441,131 | A | 8/1995 | Mayer et al. |
| 5,484,043 | A | 1/1996 | Quick et al. |
| 6,196,361 | B1 | 3/2001 | Russ et al. |
| 8,152,098 | B2 | 4/2012 | Hadley |
| 9,416,832 | B1* | 8/2016 | Murphy ................ F16D 65/186 |
| 2010/0038493 | A1* | 2/2010 | Lang .................. B64D 45/0005 244/224 |
| 2016/0016653 | A1 | 1/2016 | Barger |
| 2017/0276183 | A1* | 9/2017 | Davies .................. F16D 41/067 |

FOREIGN PATENT DOCUMENTS

| EP | 2889504 A1 | 7/2015 |
| EP | 3222869 A1 | 9/2017 |

OTHER PUBLICATIONS

Extended European Search Report for International Application No. 17275178.6 dated May 17, 2018, 6 pages.

* cited by examiner

*Primary Examiner* — Xuan Lan Nguyen
(74) *Attorney, Agent, or Firm* — Cantor Colburn LLP

(57) ABSTRACT

A brake device for braking rotation of an input shaft, comprises a selectively operable trigger brake comprising a preloaded torsion spring rotationally coupled to the input shaft but permitting a limited rotational movement between the trigger brake and the input shaft; and a roller jamming mechanism operable upon the relative rotation between the trigger brake and the input shaft exceeding a predetermined amount to stop rotation of the input shaft upon operation of the trigger brake.

15 Claims, 8 Drawing Sheets

BRAKING DEVICE

FOREIGN PRIORITY

This application claims priority to European Patent Application No. 17275178.6 filed on Nov. 2, 2017, the entire contents of which is incorporated herein by reference.

TECHNICAL FIELD

The present disclosure relates to braking devices as may be used, for example, in aircraft actuator systems.

BACKGROUND

Braking devices are used in a wide variety of applications. One such application is in aircraft, where an out board brake (OBB) is used on actuator systems such as leading edge slat systems or trailing edge flap systems to lock the actuator system in the event of various mechanical failure modes within the system, for example, a transmission shaft failure.

When not in a braking mode, the brake may still provide drag on the actuator system which represents both a burden to the system's power drive unit and also a component of torque that is additive to the fatigue duty of the transmission system between the power drive unit and the brake. Current brakes typically employ multiple static and dynamic friction plates which are fully effective as a brake but which exhibit undesirable drag, particularly at low operational temperatures. It would be desirable to minimise the drag exerted by the brake.

SUMMARY

The present disclosure provides a brake device for braking rotation of an input shaft. The device comprises a selectively operable trigger brake which comprises a preloaded torsion spring rotationally coupled to the input shaft but permitting a limited rotational movement between the trigger brake and the input shaft. A roller jamming mechanism is operable upon the relative rotation between the trigger brake and the input shaft exceeding a predetermined amount to stop rotation of the input shaft upon operation of the trigger brake.

In one embodiment, the trigger brake may comprise at least one static trigger braking element, at least one rotary trigger braking element mounted to a trigger brake shaft for rotational movement relative to the at least one static braking element, the trigger brake shaft being coupled to the at least one rotary braking element so as to rotate therewith and a brake actuator for selectively moving said static and rotary braking elements into engagement with each other. First and second ends of the torsionally preloaded spring may each be coupled to the trigger brake shaft and the input shaft. Engagement of the static and rotary braking elements overcomes the preload of the torsion spring so as to produce a relative rotation between the brake trigger shaft and the input shaft to operate the roller jamming mechanism.

In embodiments, the couplings between the first and second ends of the torsion spring and the trigger brake shaft and the input shaft comprise first and second coupling pins extending through respective apertures in the trigger brake shaft and the input shaft respectively into the torsion spring.

The openings in the input and trigger brake shafts may extend over a circumferential arc greater than the diameter of the coupling pins to permit relative rotational movement of the input and output shafts, for example over an arc of 10-20°, for example 15°.

In embodiments, the torsion spring may be arranged radially outwardly of and around the trigger brake shaft and the input shaft.

In embodiments, the roller jamming mechanism may comprise a plurality of ramp surfaces provided on the input shaft, a static structure of the device, a plurality of roller elements arranged between the input shaft and the static structure and received between adjacent ramp surfaces, and an actuator coupled to the trigger brake shaft for moving the roller elements along the ramp surfaces upon relative rotation of the trigger brake shaft and the input shaft.

In embodiments, the actuator may comprise a plurality of teeth extending between adjacent roller elements, the teeth optionally projecting from one end of the trigger brake shaft.

In embodiments, adjacent ramp surfaces may be circumferentially symmetrical.

In embodiments, the torsion spring may comprise means for varying the preload of the spring. Optionally at least one end of the torsion spring may comprise a series of circumferentially spaced opposed openings for receiving a respective coupling pin therein.

In embodiments, the torsion spring may be a machined torsion spring or manufactured using Additive Layer Manufacturing techniques.

In embodiments, the device may comprise a trigger brake actuator, for example a solenoid actuator.

In embodiments, the trigger brake actuator may comprise an actuating element which is movable between a non-braking position and a braking position under the force of a biasing spring. The spring loaded element may be held in the non-braking position against the force of the biasing spring when the actuator is energised and released upon de-energisation of the actuator.

The disclosure also extends to a drive system comprising a power transmission shaft coupled to or integrally formed with the input shaft of a brake device as described in any of the above embodiments.

The disclosure also extends to an aircraft actuator system comprising a drive system as above, the power transmission shaft driving a plurality of actuators for deploying or retracting a plurality of slats or flaps in a wing of the aircraft. Stopping rotation of the input shaft of the brake device may stop rotation of the power transmission shaft and thus deployment or retraction of the slats or flaps.

In embodiments, the aircraft system may comprise first and second power transmission shafts for driving respective pluralities of actuators in respective wings of the aircraft. A braking device may be provided for each power transmission shaft. Each power transmission shaft may be coupled to an asymmetry sensor for sensing asymmetrical operation of the power transmission shafts. Sensing of asymmetrical operation by one or other of the asymmetry sensors may cause operation of both braking devices in unison.

BRIEF DESCRIPTION OF DRAWINGS

An embodiment of this disclosure will now be described, by way of example only, with reference to the accompanying drawing in which.

DETAILED DESCRIPTION

Figure 1:
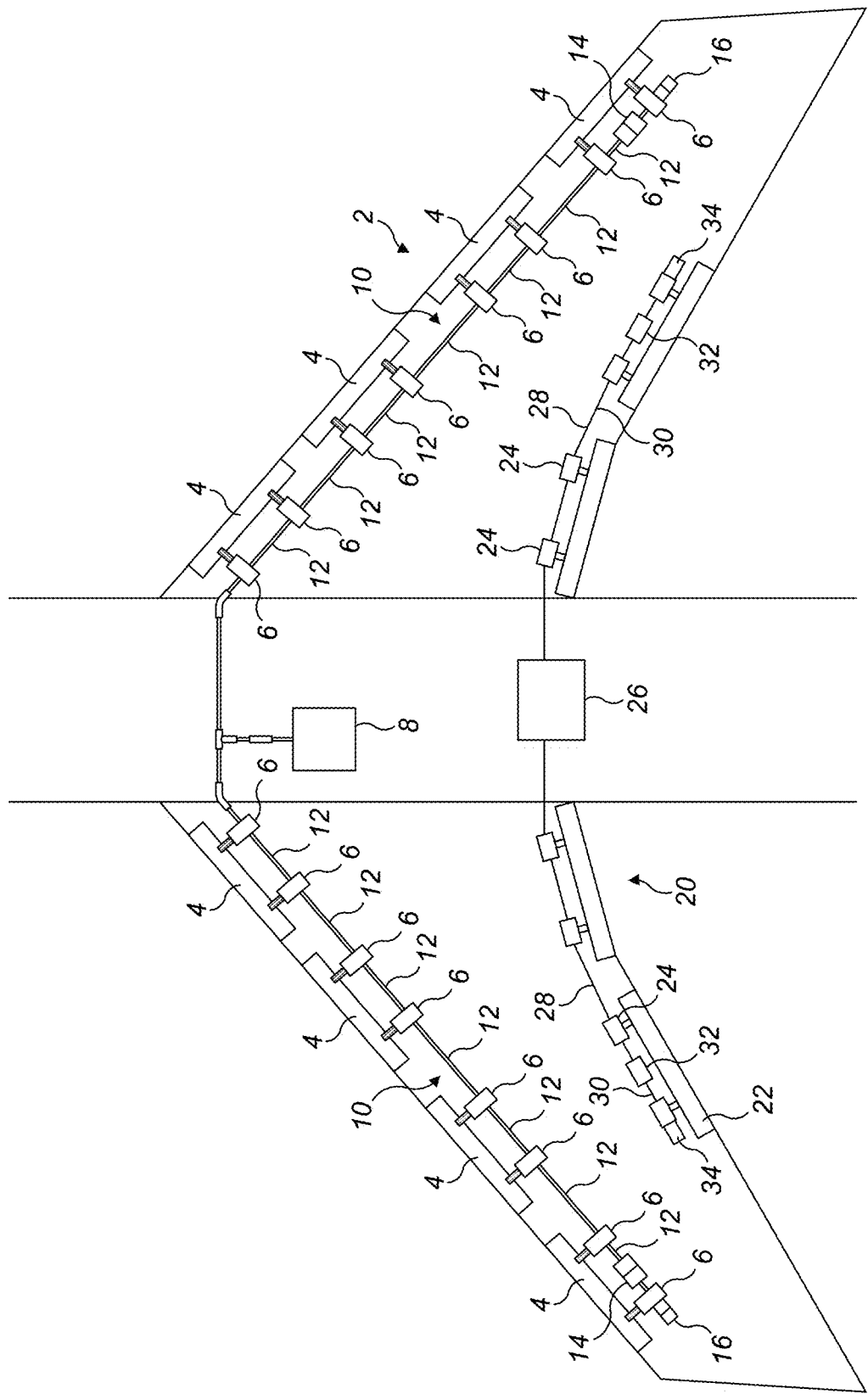
FIG. 1 shows an aircraft system comprising a plurality of actuators and a brake.

FIG. 1 illustrates an aircraft slat operating system 2. The system comprises a plurality of leading edge slats 4 on each wing which are selectively deployed and retracted by rotary actuators 6. Each actuator 6 is powered by a rotary drive from a common power drive unit 8. Drive is transmitted from the power drive unit 8 via a power transmission shaft 10, typically comprising one or more rotationally coupled sections 12, which connects the actuators 6 in series.

Out board brakes (OBBs) 14 and asymmetry sensors 16 are also included in a typical system. The OBBs 14 and asymmetry sensors 16 are typically arranged at the ends of the respective power transmission shafts 10. In an aircraft slat system 2, it is important that the slats 4 operate in a symmetrical manner. If they do not, then the aircraft wings would be subjected to undesirable unbalanced aerodynamic forces. The asymmetry sensors 16 sense any differences in the speed or direction of rotation between the transmission shafts 10 and if an asymmetry is sensed, the OBBs 12 on both wings are activated to stop the rotation of both power transmission shafts 10. This ensures that the slats 4 will remain symmetrically deployed on both wings.

Also illustrated is an aircraft flap operating system 20. This system 20 comprises a plurality of trailing edge flaps 22 which are selectively deployed and retracted by rotary actuators 24. Each actuator 24 is powered by a rotary drive from a common power drive unit 26. Drive is transmitted from the power drive unit 26 via a power transmission shaft 28, typically comprising one or more rotationally coupled sections 30, which connects the actuators 24 in series.

Out board brakes (OBBs) 32 and asymmetry sensors 34 are also included in a typical flap operating system. The OBBs 32 and asymmetry sensors 34 are typically arranged at the end of the respective power transmission shafts 28. As for the slat system 2, the asymmetry sensors 34 sense any differences in the speed or direction of rotation between the transmission shafts 28 on the two wings and if an asymmetry is sensed, the OBBs 32 on both wings are activated to stop the rotation of both power transmission shafts 28. This ensures that the flaps 22 will remain symmetrically deployed on both wings.

The slat and flap operating systems 2, 20 may also have other sensors such as slat or skew sensors (not shown) which may also cause operation of the respective OBBs 14.

This disclosure concerns the construction of a brake device which may advantageously be employed as an OBB in aircraft systems such as those discussed above. Of course, the device is not limited to such applications and it may be more widely used. As discussed above, in a traditional OBB, the brake comprises a stack of interleaved static and dynamic plates which are brought into contact to effect frictional braking. However, during normal operation, there may be some frictional or viscous drag created between the plates which produces an unwanted load on an associated power unit. The embodiments of the disclosure described hereinafter may mitigate such problems by using an alternative form of braking.

FIGS. 2 to 8B illustrate a brake device 40 in accordance with this disclosure.

Figure 2:
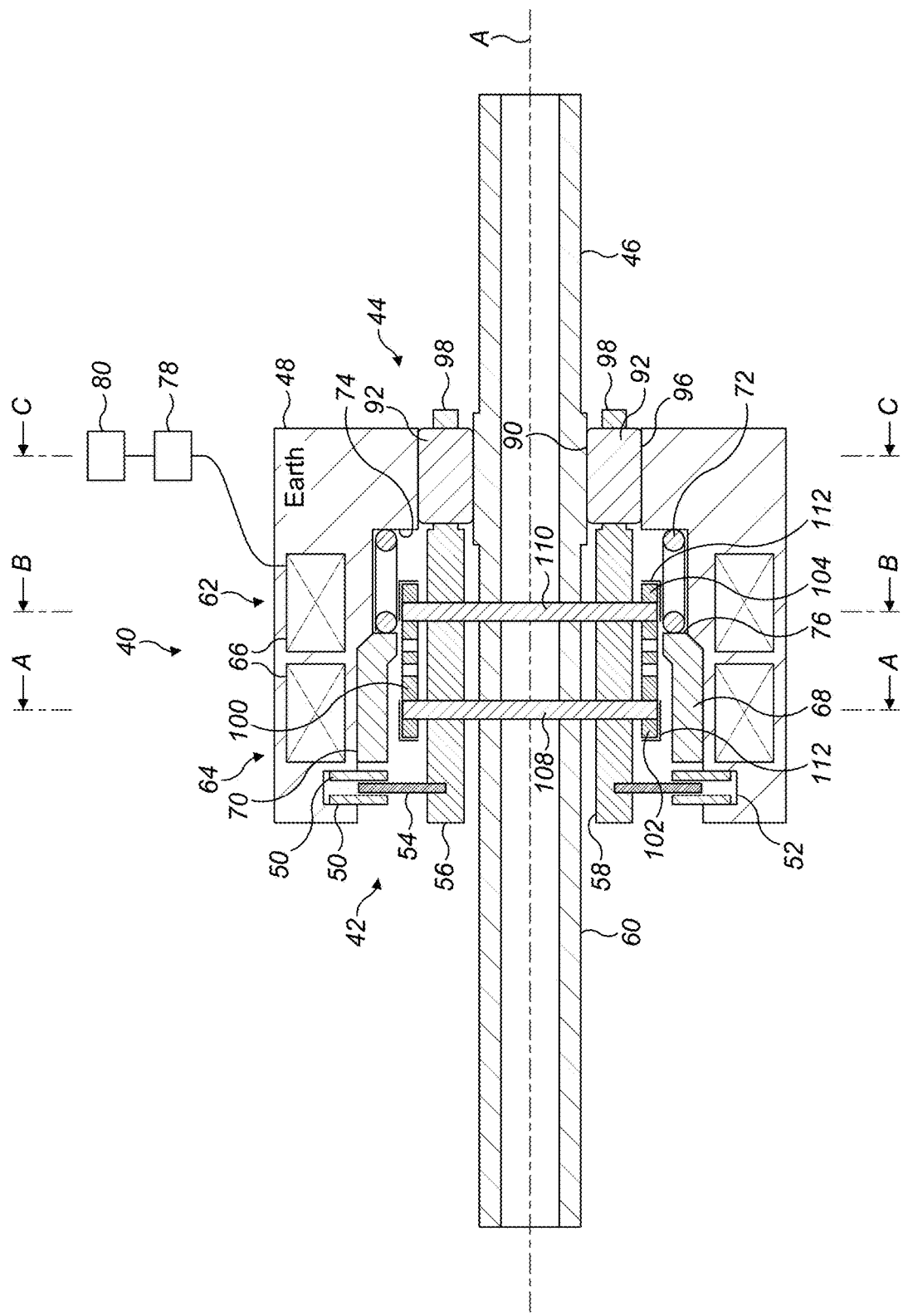
FIG. 2 shows a schematic vertical cross sectional view through a brake in accordance with this disclosure, in a first, non-braking operating condition.
Figure 3:
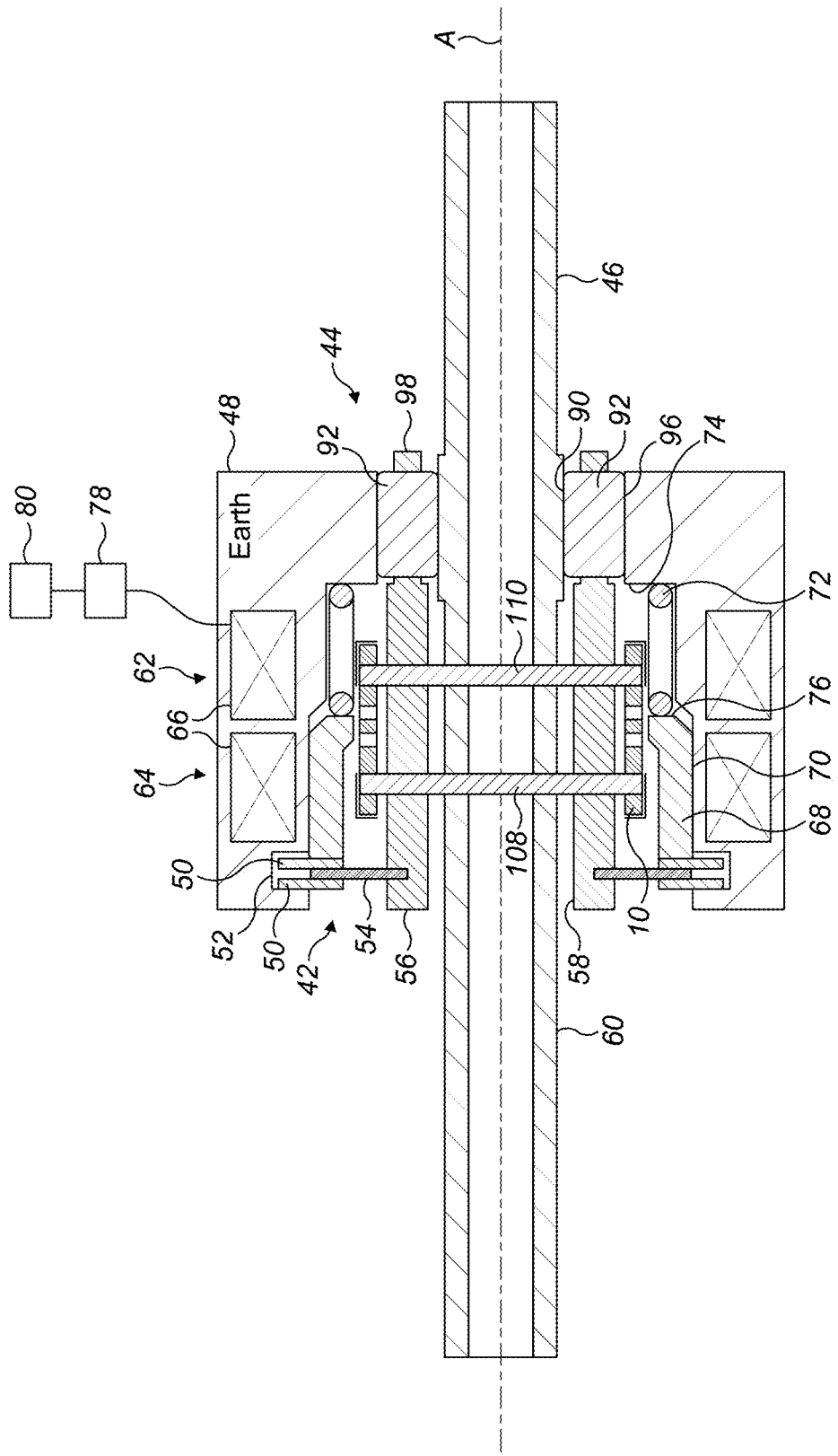
FIG. 3 shows the brake of FIG. 2 in a second, braking operating condition.

With reference to FIGS. 2 and 3, the brake device 40 broadly comprises a trigger brake 42 and a roller jamming mechanism 44. As will be described further below, triggering of the trigger brake 42 will cause operation of the roller jamming mechanism 44 which will stop the rotation of an input shaft 46 of the brake device 40.

In more detail, the brake device 40 comprises a housing 48 which mounts the various components of the device 40. The trigger brake 42 comprises one or more static braking elements 50 which are rotationally fixed relative to the housing 48, for example in an annular recess 52 in the housing 48, but are free to move axially. The static braking elements 50 in this embodiment are illustrated as brake plates.

The trigger brake 42 further comprises one or more dynamic braking elements 54 which are mounted to a trigger brake shaft 56 for rotation therewith, but are also free to move axially. As illustrated, the dynamic braking elements 54 are brake plates, although other forms of rotary braking elements 54 compatible with the static braking elements 50 may be used. The number of static and dynamic braking elements 50, 54 may be chosen to suit any particular application.

The trigger brake shaft 56 and thus the rotary braking elements 54 are mounted in the housing 48 such that they may rotate around a longitudinal axis A of the device 40.

In one embodiment, the radially inner surface 58 of the trigger brake shaft 56 may be slidably and rotatably mounted on the radially outer surface 60 of the input shaft 46. This is illustrated in FIGS. 5 to 8.

The rotary braking elements 54 and static braking elements 50 are engageable to effect a frictional braking of the trigger brake shaft 56. To effect this engagement a trigger brake actuator 62 is provided. In the embodiment illustrated, the trigger brake actuator 62 is an electro-mechanical actuator, although other forms of actuator, for example hydraulic or pneumatic actuator may be used.

The electro-mechanical actuator 62 disclosed comprises a solenoid 64 having a coil or coils 66 mounted within the housing 48 and an armature 68 mounted for reciprocating movement within an inner bore 70 of the housing 48. The armature 68 may, for example be slidably mounted in the inner bore 70, by means of suitable linear bearings. The armature 68 is biased towards the braking elements 50 by means of a biasing spring 72, for example a coil spring 72 received between an end wall 74 of the housing inner bore 70 and a surface, for example an end surface 76, of the armature 68. Of course other forms of biasing spring 72 may be used.

The armature 68 is movable axially within the inner bore 70 of the housing 48 between the position illustrated in FIG. 2 in which it does not engage the braking elements 50, 54 and the position illustrated in FIG. 3 in which it engages the braking elements 50, 54 to urge them into frictional engagement, thereby triggering the trigger brake 42. As discussed above, the static and dynamic braking elements 50, 54 are able to move axially (albeit by a relatively small amount), thereby moving into frictional engagement with one another under the influence of the spring loaded armature 68. In the context of an aircraft actuator system as discussed above, the position illustrated in FIG. 2 is a flight normal condition and the position illustrated in FIG. 3 a fault condition.

The solenoid coils 66 are connected to an electrical power supply 78 which is selectively energisable by means of a control 80. The control 80 may, in the context of the applications discussed above, be the asymmetry sensors 16, 34.

In the embodiment illustrated, the solenoid 64 is normally energised in order to maintain the brake device 40 in the non-braking condition illustrated in FIG. 2. This means that should a failure occur in the power supply 78, the armature 68 will move to the braking position shown in FIG. 3 under the force of the biasing spring 72, thereby triggering the trigger brake 42. Similarly, when the power supply 78 is switched off by the control 80, the armature 68 will move to trigger the trigger brake 42.

The trigger brake 42 simply acts as a trigger for the braking effected by the brake device 40. The braking is achieved through the roller jamming mechanism 44 as will be described further below.

The brake device 40 comprises an input shaft 46 to which the braking force is applied. The input shaft 46 may be a part of or coupled to a power transmission shaft as disclosed above.

Figure 4:
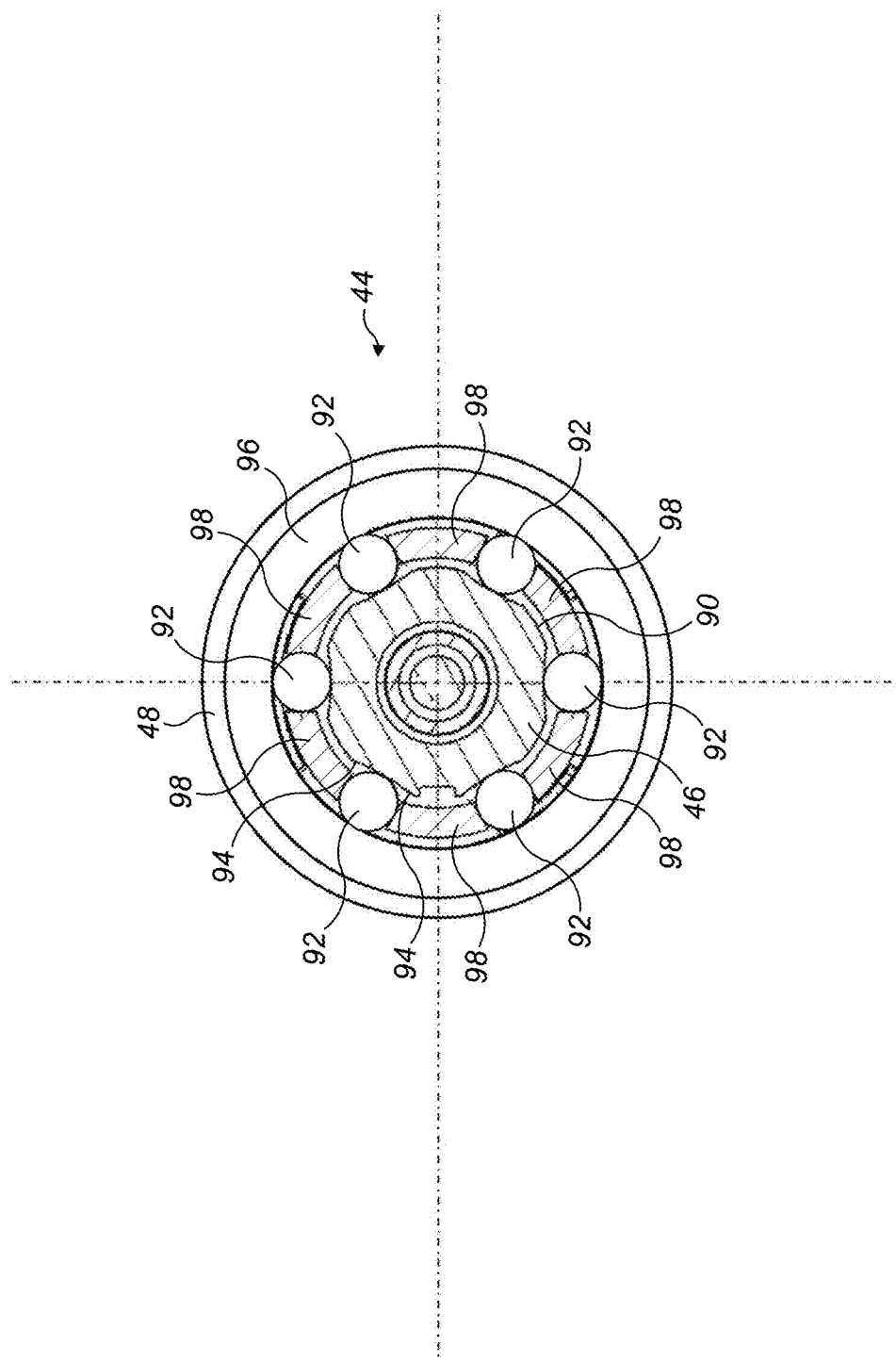
FIG. 4 shows a sectional view along line C-C of FIG. 2 in the first operating condition of the brake.

As can best be seen in FIG. 4, the input shaft 46 comprises a roller receiving surface 90 which receives a plurality of roller elements 92. As discussed above, an outer surface 60 of the input shaft may receive a radially inner surface 58 of the trigger brake shaft 56. The roller receiving surface 90 is provided with a plurality of symmetrical ramps 94 between which the roller elements 92 locate. The roller elements 92 are received within an annular bore 96 of the housing 48 and which forms a static structure.

The trigger brake shaft 56 comprises a plurality of projecting teeth 98 which, as can be seen from FIG. 4 extend between the roller elements 92. As will be explained further below, the roller elements 92, ramps 94, teeth 98 and annular bore ring 96 together forms a roller jamming mechanism 44.

Arranged around the trigger brake shaft 56 is mounted a machined torsion spring 100. In this embodiment the torsion spring 100 is made from CRES, titanium or titanium alloy, although other materials may be used. The material of the spring 100 is chosen to provide the necessary strength and torsional compliance. In other embodiments, the torsion spring may be manufactured using Additive Layer Manufacturing techniques.

Figure 5:
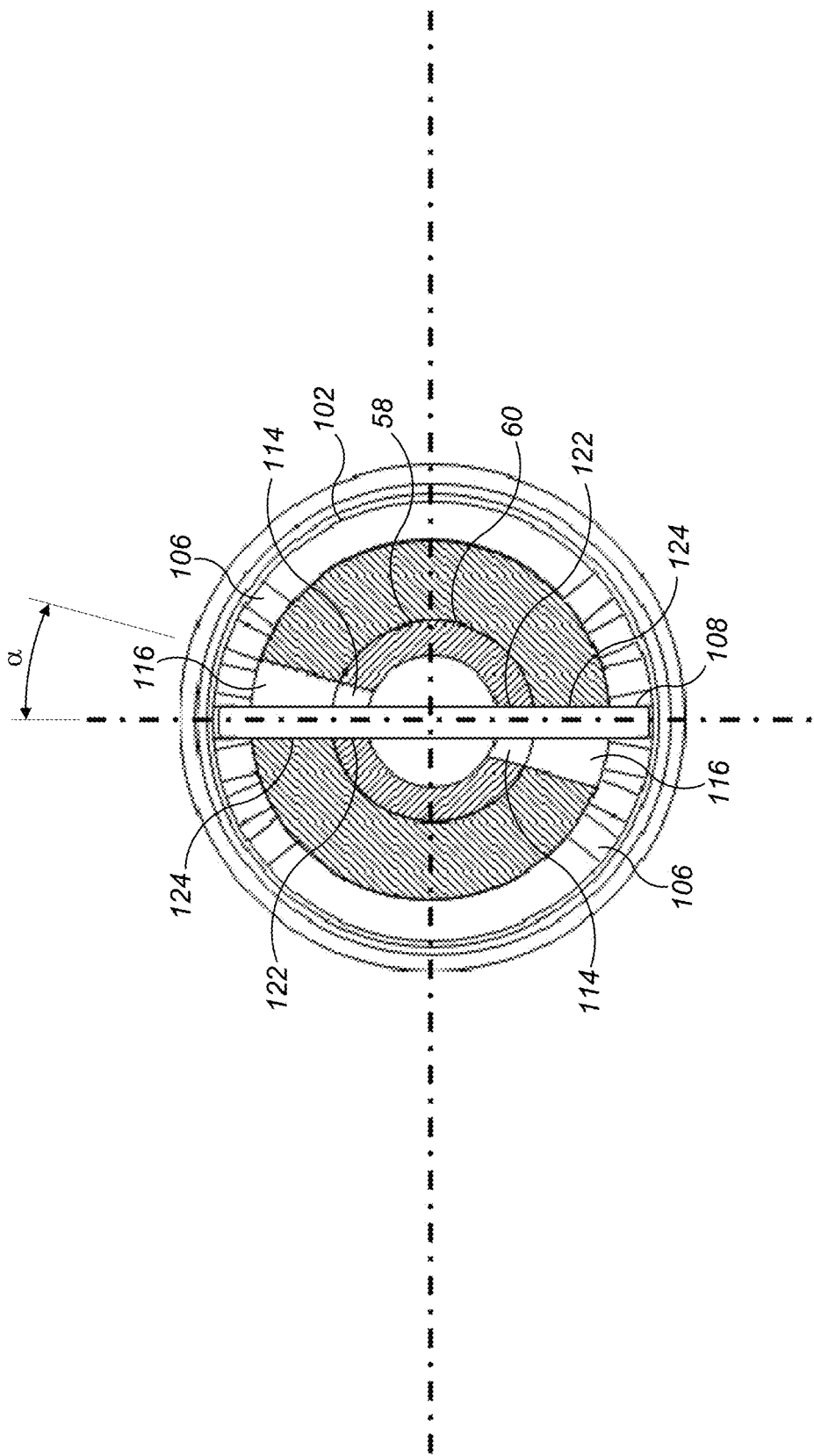
FIG. 5 shows a sectional view along line A-A of FIG. 2 in the first operating condition of the brake.

The torsion spring 100 has first and second ends 102, 104. Both ends 102, 104 are formed with openings 106 for receiving the ends of first and second coupling pins 108, 110. As shown in FIG. 5, at least the first end 102 of the torsion spring 100 may be provided with a series of circumferentially spaced, diametrically opposed openings 106 for a purpose to be described further below. The second end 104 may be provided with just one pair of opposed openings 106. The first and second ends 102, 104 of the torsion spring 100 may be covered by caps 112 which may radially retain the coupling pins 108, 110.

Figure 6:
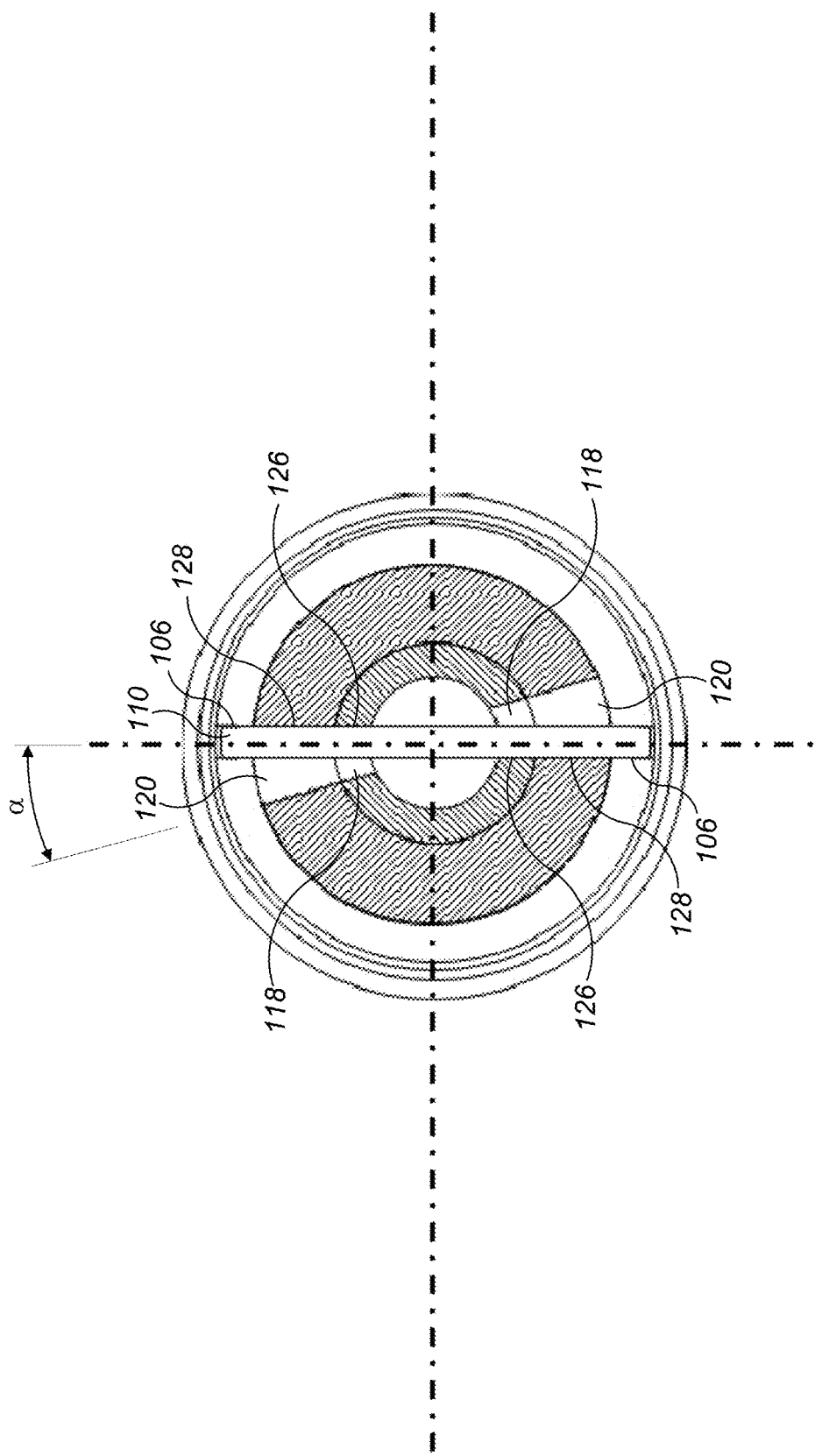
FIG. 6 shows a sectional view along line B-B of FIG. 2 in the first operating condition of the brake.

As illustrated in FIGS. 5 and 6, the first coupling pin 108 extends through first opposed respective openings 114 in the input shaft 46 and through first opposed openings 116 provided in the trigger brake shaft 56. The second coupling pins 110 extend through second opposed openings 118 in the input shaft 46 and second opposed openings 120 in the brake trigger shaft 56. As can be seen in FIGS. 5 and 6 the openings 114, 116 and the openings 118, 120 are aligned to allow passage of the respective coupling pins 108, 110. Each opening 114, 116, 118, 120 is circumferentially larger than the coupling pin 108, 110 it receives, having an angular extent α. This will allow relative rotational movement between the input shaft 46 and the trigger brake shaft 56 as will be described further below. In this embodiment the angle α may be between 10 and 15° for example.

The torsion spring 100 is torsionally preloaded. That is, the first and second ends 102, 104 of the torsion spring 100 are rotated in opposite directions from one another from the spring's rest position, before the coupling pins 108, 110 are inserted through the openings 114, 116, 118, 120. The required degree of preload is achieved by engaging the second coupling pin 110 in the openings 106 at the second end 104 of the torsion spring and the coupling pin 108 in the desired pair of opposed openings 106 in the first end 102 of the torsion spring 100.

The effect of this is to bias the coupling pins 108, 110 into contact with the walls of the openings 102, 104 in the input and trigger brake shafts 46, 56, as shown in FIGS. 5 and 6. The first coupling pin 108 is biased into contact with clockwise (in the sense of FIG. 5) facing surfaces 122, 124 of the openings 114, 116. However, the second coupling pin 110 is biased into contact with the counter-clockwise (in the sense of FIG. 6) facing surfaces 126, 128 of the openings 118, 120.

Figure 7A:
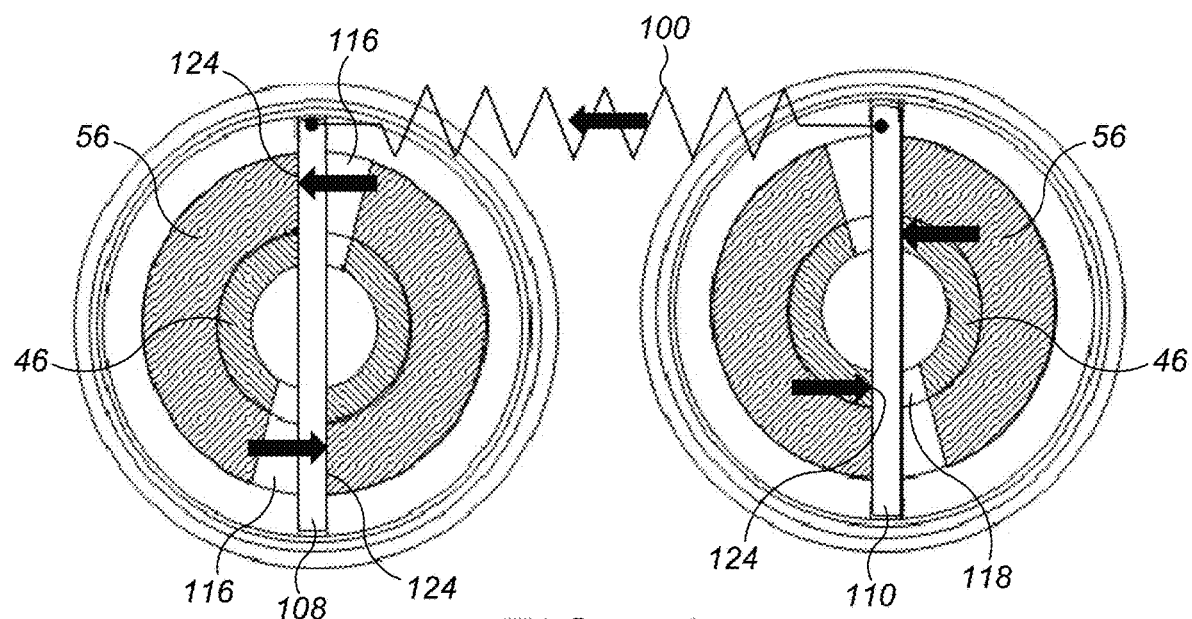
FIG. 7A shows, schematically, force transmission in the brake device in the first operating condition with the input shaft rotating in a clockwise direction.

In operation, the drive shaft 46 may rotate in either a clockwise or counter-clockwise direction, depending, for example, on the required direction of rotation of an actuator. FIG. 7A illustrates how torque is transmitted between the input and trigger brake shafts 56, 50 of the brake device 40 when the input shaft 46 is rotating in a counter-clockwise direction in the sense of FIGS. 5 and 6.

In this mode of operation, the counter-clockwise facing surfaces 126 of the openings 118 in the input shaft 46 transmit torque to the second coupling pin 100. This torque is then transmitted into the second end 104 of the torsion spring 100, through the torsion spring 100 into the first end 102 of the torsion spring 100 and from there into the first coupling pin 108. The first coupling pin 108 then transmits the torque to the clockwise facing surfaces 124 of the openings 116 in the trigger brake shaft 56, thereby causing the trigger brake shaft 50 to rotate. The trigger brake shaft 56 will rotate at the same speed as the input shaft 46, so that there is no relative rotation between the two shafts.

Figure 8A:
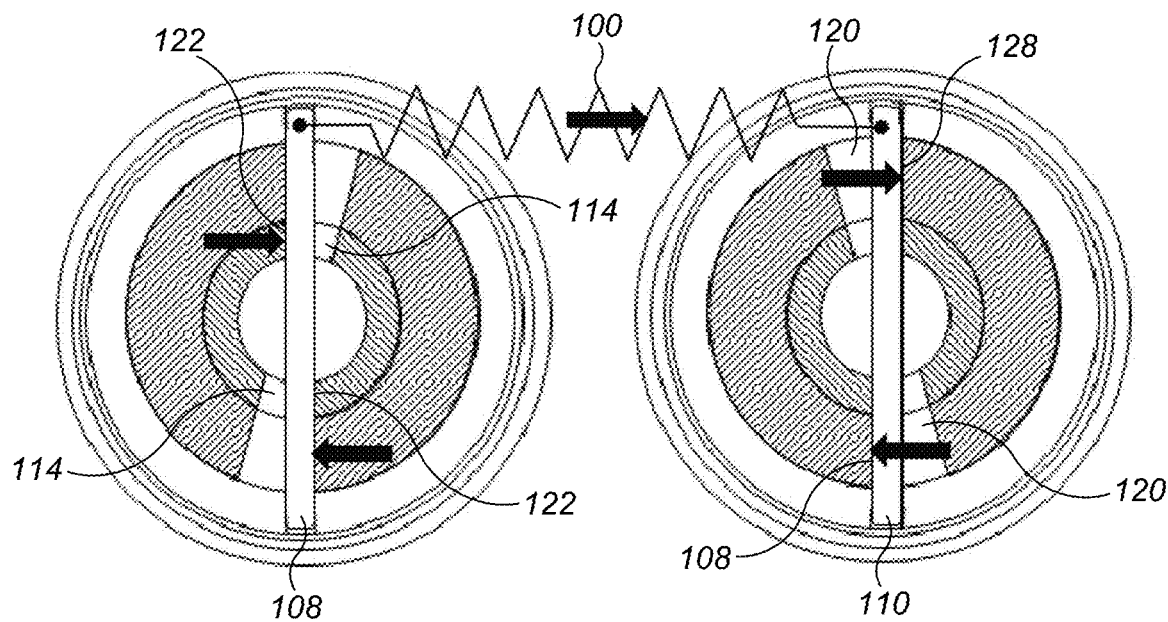
FIG. 8A shows, schematically, force transmission in the brake device in the first operating condition with the input shaft rotating in a counter-clockwise direction.

FIG. 8A illustrates how torque is transmitted between the input and trigger brake shafts 46, 56 of the brake device when the input shaft 46 is rotating in a clockwise direction in the sense of FIGS. 5 and 6.

In this mode of operation, the clockwise facing surfaces 122 of the openings 114 in the input shaft 46 transmit torque to the first coupling pin 108. This torque is then transmitted into the first end 102 of the torsion spring 100, through the torsion spring 100 into the second end 104 of the torsion spring 100 and from there into the second coupling pin 110. The second coupling pin 110 then transmits the torque to the counter-clockwise facing surfaces 128 of the openings 120 in the trigger brake shaft 56, thereby causing the trigger brake shaft 56 to rotate with the input shaft 46. Again, the trigger brake shaft 56 will rotate at the same speed as the input shaft 46, so that there is no relative rotation between the two shafts.

Of course, rotation of the trigger brake shaft 56 with the input shaft 46 is only possible when the trigger brake solenoid 62 is energised. In the event that the solenoid becomes de-energised, the trigger brake plates 50, 54 will move into frictional engagement and brake the rotation of the trigger brake shaft 56. This will result in the preload of the torsion spring 100 being exceeded.

Figure 7B:
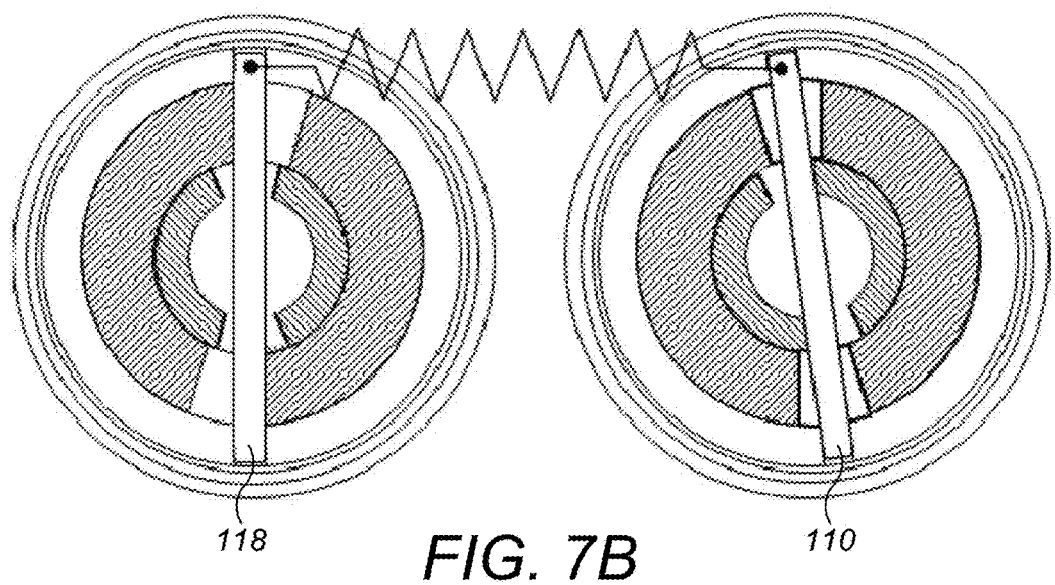
FIG. 7B shows, schematically, force transmission in the brake device in the second condition with the input shaft rotating in a clockwise direction.
Figure 8B:
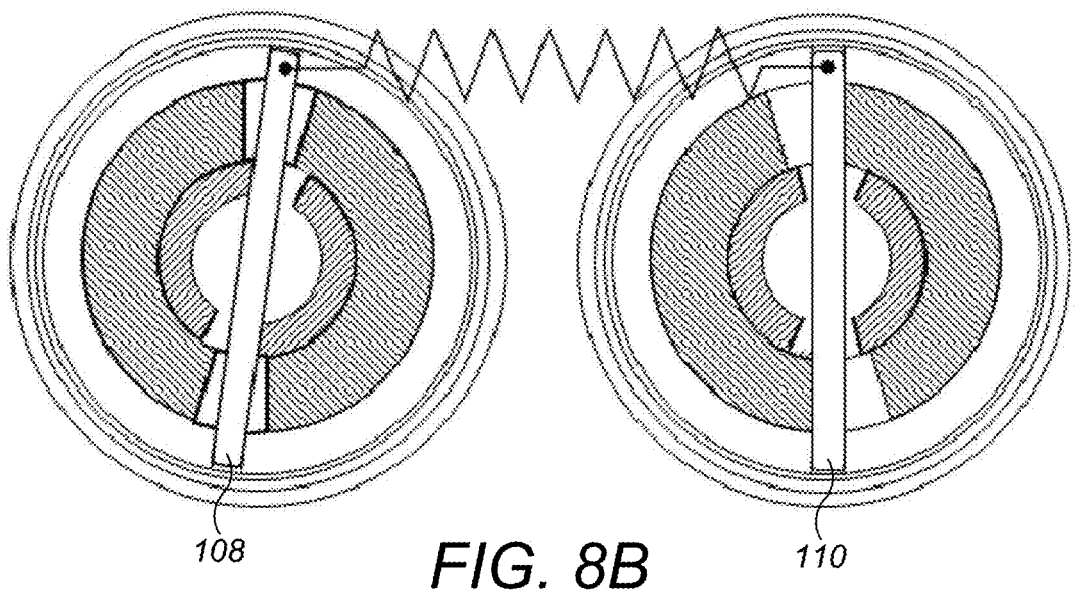
FIG. 8B shows, schematically force transmission in the brake device in the second operating condition with the input shaft rotating in a counter-clockwise direction.

As illustrated schematically in FIGS. 7B and 8B, when the preload is exceeded, the torsion spring 100 rotates the first and second coupling pins 108, 110 relative to one another, permitting relative rotation of the input and brake trigger shafts 46, 56 relative to one another. Once there is relative movement between these shafts 46, 56, the roller elements 92 in the jamming mechanism will be forced up the ramps 94 on the roller receiving surface 94 of the input shaft 46 by the teeth 98 of the trigger brake shaft 56, thereby forcing the roller elements 92 into wedged contact with the annular surface 96 of the housing 48, thereby stopping the rotation of the input shaft 46.

Due to the symmetrical configuration of the ramps 64, the device will operate at the same degree of relative angular displacement irrespective of the direction of rotation of the input shaft 46.

The aim of the brake device 40 is to operate as quickly as possible after a fault occurs to stop the input shaft 46 as soon as possible. The torque value with which the brake device 40 will operate is determined by the torsional spring rate of the torsion spring 100 and the degree of preload. In the embodiment described above, the jamming mechanism 44 is activated with about 5° of relative rotational movement of the input and trigger brake shafts 46, 56

It will be appreciated that if the brake device 40 is embodied in a system as illustrated in FIG. 1, as soon as the brake device 40 operates, it will stop the rotation of the entire associated power transmission shaft 10, 28. This will stop operation of all actuators 6, 24 driven by the power transmission shaft 10, 28.

As discussed above, in such a system, the brake device 40 may be operated in response to a signal from the asymmetry sensors 16, 34 which may indicate a fault such as a failure in one of the power transmission shafts 10, 28. In that event, both OBBs 14, 32 may be operated in unison to stop both power transmission shafts 10, 28 connected to an associated power drive unit 8, 26. This will prevent asymmetrical deployment of the slats 4 or flaps 22. Alternatively, just one of the OBBs 14, 32 may be activated as the transmission shafts 10, 28 may be coupled together such that when one stops rotating, so does the other.

To release the brake device 40, the solenoid 62 is once more energised, which moves the armature 68 out of engagement with the braking plates 50 against the force of the biasing spring 72. This releases the trigger brake 42, allowing the torsion spring 100 to return to its original, preloaded configuration, thereby allowing the teeth 98 thereon to move away from the roller elements 92, thereby allowing the roller elements 92 to return to the "unjammed" position shown in FIG. 4.

It will be appreciated that the embodiment described herein has a number of advantages over the prior art braking systems. Specifically, the trigger brake 42 need only have relatively small braking elements 50, 54 as the braking force of the brake unit 40 is not generated by those elements, but by the roller jamming mechanism 44. The braking elements 50, 54 need only be sufficiently large to overcome the preload of the torsion spring 100 so as to brake the trigger brake shaft 56. While there may be a certain drag associated with the braking elements 50, 54, this will be much smaller than that of braking elements which would be required to brake the entire system. This represents less power absorbed in the brake unit 40, which will potentially allow for a less powerful and therefore lighter power drive unit.

In view of the arrangement of the torsion spring 100 around the input and trigger brake shafts 46, 56, the brake unit 40 provides a relatively compact construction, which is advantageous in restricted operating spaces, such as aircraft wings. Also, the desired degree of preload of the torsion spring 100 can be easily set.

The above description is of an exemplary embodiment only, and it will be clear that modifications may be made to the embodiment without departing from the scope of the disclosure. For example, while the trigger brake shaft 56 of the brake device 40 has been illustrated as a single component, it may be formed as a number of components suitably joined or coupled together. The pattern of openings 106 in the spring end 104 may differ in order to achieve the required resolution of preload in the spring 100. A combination of openings 106 may also be provided in both spring ends 102 and 104 to further enhance preload setting. Although these openings 106 are depicted as holes they may take the form of slots In addition, while a machined torsion spring 100 has been disclosed, other torsion springs may be used, for example coil springs. Machined torsion springs may, however, be advantageous in that they facilitate providing integrated spring ends for receiving the coupling pins.

Also, while the brake device 40 has been disclosed as being used in an aircraft actuator system, it may of course be used in any application where braking of a rotary shaft is required. Examples of such applications may include automotive parking brakes and elevator, escalator and moving walkway brakes.

The invention claimed is:

1. A brake device for braking rotation of an input shaft, comprising:
    a selectively operable trigger brake comprising a preloaded torsion spring rotationally coupled to the input shaft but permitting a limited rotational movement between the trigger brake and the input shaft; and
    a roller jamming mechanism operable upon the relative rotation between the trigger brake and the input shaft exceeding a predetermined amount to stop rotation of the input shaft upon operation of the trigger brake, wherein the roller jamming mechanism comprises:
    a plurality of ramp surfaces provided on the input shaft;
    a housing comprising an annular bore;
    a plurality of roller elements arranged between the input shaft and the annular bore, the roller elements being received within the annular bore and received between adjacent ramp surfaces; and
    an actuator coupled to the trigger brake shaft for moving the roller elements along the ramp surfaces upon relative rotation of the trigger brake shaft and the input shaft thereby forcing the roller elements into wedged contact with the annular bore of the housing.

2. A brake device as claimed in claim 1, wherein the trigger brake comprises:
    at least one static trigger braking element;
    at least one rotary trigger braking element mounted to a trigger brake shaft for rotational movement relative to the at least one static braking element, the trigger brake shaft being coupled to the at least one rotary braking element so as to rotate therewith; and a brake actuator for selectively moving said static and rotary braking elements into engagement with each other;

wherein first and second ends of the torsionally preloaded spring are each coupled to the trigger brake shaft and the input shaft;

wherein the engagement of the static and rotary braking elements overcomes the preload of the torsion spring so as to produce a relative rotation between the brake trigger shaft and the input shaft to operate the roller jamming mechanism.

3. A brake device as claimed in claim 2, wherein the couplings between the first and second ends of the torsion spring and the trigger brake shaft and the input shaft comprise first and second coupling pins extending through respective apertures in the trigger brake shaft and the input shaft respectively into the torsion spring.

4. A brake device as claimed in claim 3 wherein the openings in the input and trigger brake shafts extend over an circumferential arc (α) greater than the diameter of the coupling pins to permit relative rotational movement of the input and output shafts.

5. A brake device as claimed in claim 2, wherein the torsion spring is arranged radially outwardly of and around the trigger brake shaft and the input shaft.

6. A brake device for braking rotation of an input shaft, comprising:
   a selectively operable trigger brake comprising a preloaded torsion spring rotationally coupled to the input shaft but permitting a limited rotational movement between the trigger brake and the input shaft; and
   a roller jamming mechanism operable upon the relative rotation between the trigger brake and the input shaft exceeding a predetermined amount to stop rotation of the input shaft upon operation of the trigger brake, wherein the roller jamming mechanism comprises:
   a plurality of ramp surfaces provided on the input shaft;
   a static structure of the device;
   a plurality of roller elements arranged between the input shaft and the static structure and received between adjacent ramp surfaces; and
   an actuator coupled to the trigger brake shaft for moving the roller elements along the ramp surfaces upon relative rotation of the trigger brake shaft and the input shaft.

7. A brake device as claimed in claim 6, wherein the actuator comprises a plurality of teeth extending between adjacent roller elements, the teeth projecting from one end of the trigger brake shaft.

8. A brake device as claimed in claim 6, wherein adjacent ramp surfaces are circumferentially symmetrical.

9. A brake device as claimed in claim 1, wherein the torsion spring comprises means for varying the preload of the spring, wherein optionally at least one end of the torsion spring comprises a series of circumferentially spaced opposed openings for receiving a respective coupling pin therein.

10. A brake device as claimed in claim 1, wherein the torsion spring is a machined torsion spring or manufactured using Additive Layer Manufacturing techniques.

11. A brake device as claimed in claim 1, comprising a trigger brake actuator which is, a solenoid actuator.

12. A brake device as claimed in claim 11, wherein said trigger brake actuator comprises an actuating element which is movable between a non-braking position and a braking position under the force of a biasing spring, the actuating element being held in the non-braking position against the force of the biasing spring when the actuator is energised and released upon de-energisation of the actuator.

13. A drive system comprising a power transmission shaft coupled to or integrally formed with the input shaft of the brake device as claimed in claim 1.

14. An aircraft actuator system comprising:
   the brake device as claimed in claim 1; and
   a drive system comprising a power transmission shaft coupled to or integrally formed with the input shaft of the brake device;
   the power transmission shaft driving a plurality of actuators for deploying or retracting a plurality of slats or flaps in a wing of the aircraft, wherein stopping rotation of the input shaft of the brake device stops rotation of the power transmission shaft and thus stops deployment or retraction of the slats or flaps.

15. An aircraft system as claimed in claim 14, comprising first and second power transmission shafts for driving respective pluralities of actuators in respective wings of the aircraft, the braking device being provided for each power transmission shaft; wherein, each power transmission shaft is coupled to an asymmetry sensor for sensing asymmetrical operation of the power transmission shafts, and sensing of asymmetrical operation by one or other of the asymmetry sensors causes operation of both braking devices in unison.

* * * * *